C. R. CONNER.
CLAMPING DEVICE.
APPLICATION FILED DEC. 15, 1916. RENEWED FEB. 5, 1918.
1,258,536.
Patented Mar. 5, 1918.
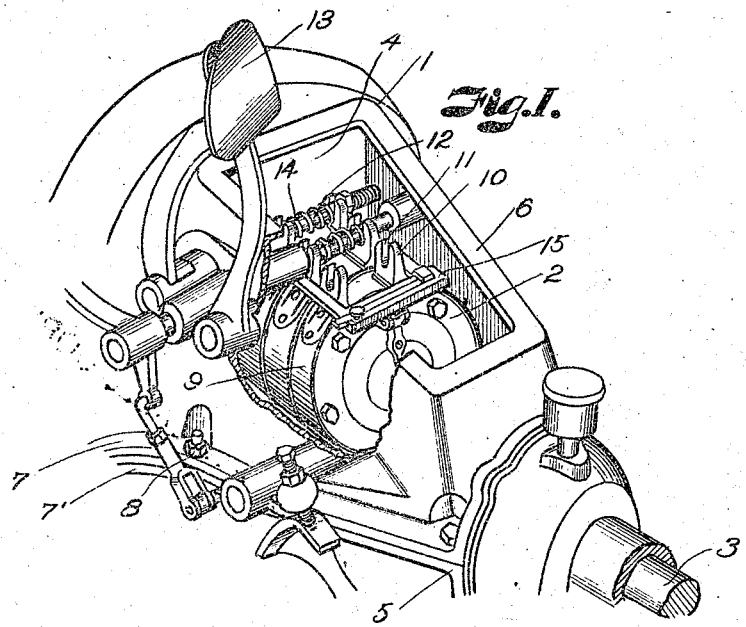
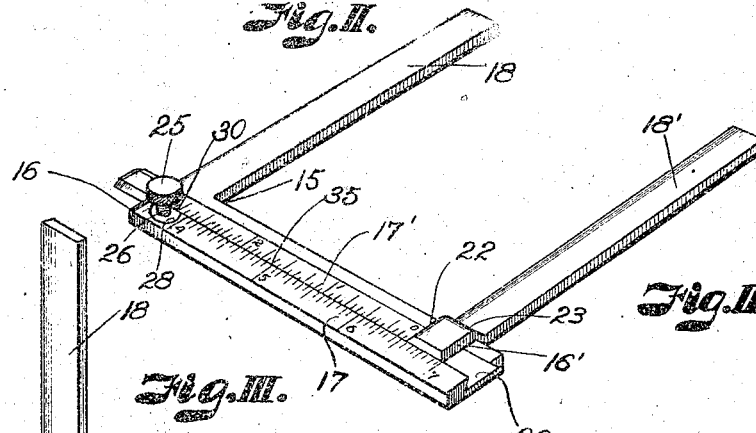
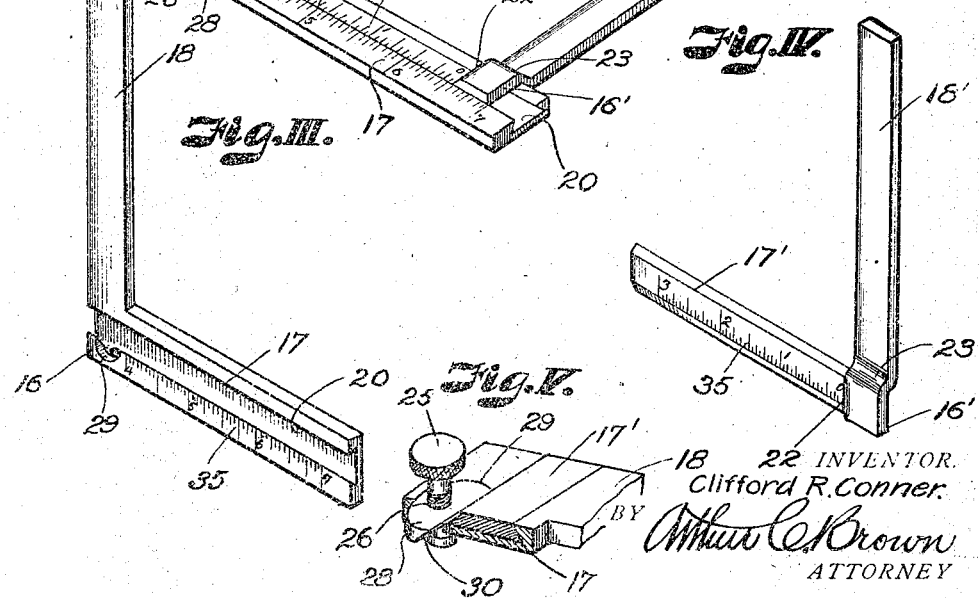
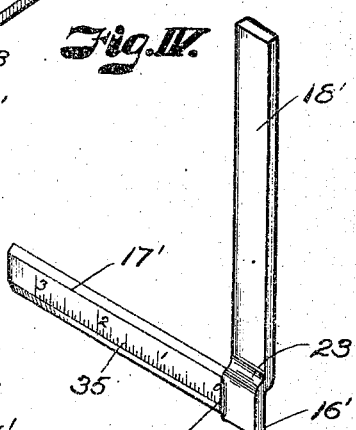
INVENTOR.
Clifford R. Conner.
BY Arthur C. Brown
ATTORNEY

UNITED STATES PATENT OFFICE.

CLIFFORD R. CONNER, OF KANSAS CITY, MISSOURI, ASSIGNOR OF ONE-HALF TO CHARLES A. STEINBECK, OF KANSAS CITY, MISSOURI.

CLAMPING DEVICE.

1,258,536.   Specification of Letters Patent.   Patented Mar. 5, 1918.

Application filed December 15, 1916, Serial No. 137,213. Renewed February 5, 1918. Serial No. 215,559.

*To all whom it may concern:*

Be it known that I, CLIFFORD R. CONNER, a citizen of the United States, residing at Kansas City, in the county of Jackson and State of Missouri, have invented certain new and useful Improvements in Clamping Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to clamping devices and more particularly to an adjustable clamp adapted to facilitate the assembling of inclosing members about planetary transmission mechanism, such as is ordinarily used in automobile construction, the principal object of the invention being to provide means whereby the transmission bands and parts thereon may be held in proper alinement relative to parts on the interior of the inclosing members, so that when the latter are placed in position, the parts carried thereby and parts on the transmission bands will coöperate to perform their function.

It is also an object of the invention to provide means for quickly adjusting and locking the clamp at a desired width and to provide the parts with graduations, so that the device may be used conveniently for calipering purposes.

In accomplishing these objects, I have provided improved details of structure, the preferred forms of which are illustrated in the accompanying drawings, wherein:—

Figure I is a detail perspective view of a transmission mechanism illustrating the function of a clamp embodying the present invention; the cover of the transmission base being broken away to show parts mounted therein.

Fig. II is a detail perspective view of the clamp.

Fig. III is a perspective view of one of the clamp members.

Fig. IV is a detail perspective view of the opposite coöperating member.

Fig. V is a transverse section on line V—V, Fig. II showing the clamp locking nut.

Referring more in detail to the drawings:—

1 designates an automobile transmission mechanism, commonly known as the planetary type, comprising transmission drums 2, which are mounted on a power shaft 3 that extends from an engine (not shown) and which carries a fly wheel 4; the said mechanism being inclosed within a casing, comprising a lower or base portion 5, and a cover portion 6, having apertured flange portions 7—7' for receiving bolts 8, whereby the casing members may be locked together about the transmission parts.

Surrounding the drums 2 are transmission bands 9, the opposite ends of which terminate in spaced relation and are provided with laterally extended ears 10 having outwardly opening sockets 11 therein for seating the band tensioning rods 12 which are mounted within and extend outwardly from the cover 6 and are provided with pedals 13 whereby they may be actuated to tighten the bands 9 about their respective drums, to retard the motion of the latter.

Inclosing the rods 12 are springs 14 which are adapted, when in position, to seat between and to bear against the upturned ends of the band ears 10 to urge the same outwardly to remove friction from the drums.

To those familiar with the assembling of these parts it is known that it is necessary, before the cover 6 is placed in position, to adjust the band members to a proper alinement and secure them by some means in this adjusted position or difficulty will be experienced in bringing the cover 6 and parts carried therein into registering positions.

In assembling the parts it is common practice before the cover 6 is placed to tie the bands in position with string, and later after the cover is in position to remove the string, but this method requires considerable time, and proper adjustment is not easily acquired.

In order to eliminate this difficulty of acquiring a proper adjustment and alinement of the band parts, and to provide means for greatly facilitating the work of assembling the parts, I provide the clamp 15 embodying the present invention and which is illustrated particularly in Fig. II.

The device in its preferred construction comprises the clamp members 16—16' having base portions 17—17', provided with outwardly extending parallel arms 18—18' respectively; the base plate 17 being provided on one face with a longitudinally extending dove tail groove 20 which is adapted to slidably receive the dove tailed base plate 17' of the opposite clamp member, so that the two clamp arms 18—18' may be moved toward or away from each other.

In order to permit the clamp arms to be brought flush together I provide the end of the base plate 17' carrying the arm 18' with an upward offset 22 which raises the arm 18' clear of the base 17 and then give the arm 18' a downward offset 23 adjacent its base to bring the two arms 18—18' in the same horizontal plane, so that when moved to their inner limit their adjacent edges will seat flush together.

As a means of holding the clamp arms in an adjusted position I provide a set screw 25 having a threaded shank 26 which extends through the base 17 and is swiveled therein. Threaded onto the shank 26 is a nut 28 that seats in a socket 29 in the base 17 adjacent to the groove and has a flat edge surface 30 adapted to engage the beveled edge of the base 17' and which may be tightened thereagainst to lock the slidably connected base plates in an adjusted position.

In order to adapt the device for use as a calipering instrument I provide the edge of the base 17' and an adjacent portion of the base 17 with graduations 35, so that the clamp may be set at a desired position before being placed about the band members or may be used for other measuring purposes, the graduations in the plate 17' running from the arm 18' toward the free end of the plate, so that the reading may be made from the inner edge of arm 18 when the arms are moved apart after being closed against each other, and the graduations on the plate 17 running in the opposite direction and continuing from those on the first plate, so that they may be read from the end of the plate 17' when the arms have been spread to carry the free end of plate 17' inwardly of the edge of arm 18.

The cover portion 6 is then seated over the mechanism so that the tensioning rods 12 seat in the ear sockets 11 and the springs 13 bear against the inner face of the band ears.

After the cover has been properly seated and secured in position and the tension rods adjusted, the clamp is removed through the top opening 40 of the cover.

It is apparent that with a device of this character, the transmission bands may be held in alinement while the parts are being assembled and when the cover has been bolted in position and proper adjustment has been made, the clamp may be removed therefrom to release the bands.

It is also apparent that by providing the graduated surface, the device may be used to a good advantage as a calipering instrument.

Having thus described my invention, what I claim as new therein and desire to secure by Letters-Patent, is:—

1. A tool of the character described comprising a pair of base members, each having a laterally directed arm and one having a dovetailed groove in its face, the other base member being dovetailed to slide in said groove, the first base member having a socket opening to said groove, a threaded shank carried by the first base member and extending through the socket, a clamp member threaded on the shank and fitting the socket and the dovetailed edge of the second base member and a handle portion on said shank whereby the clamp member may be adjusted to loosen or fix the dovetailed base member substantially as set forth.

2. A tool of the character described, comprising a pair of base members, one having a longitudinal groove along one face and the opposite member being dovetailed to slidably seat in said groove, each member having an arm at its outer end extending parallel with a like arm on the other plate, the end of one plate being outset at the base of its arm and the said arm being downset to permit said arm to move along the outer plate and abut against the arm thereon.

In testimony whereof I affix my signature.

CLIFFORD R. CONNER.